United States Patent [19]

Wilson

[11] 4,391,613
[45] Jul. 5, 1983

[54] MULTI-STATION DOWNFLOW CENTRIFUGAL SEPARATION METHOD AND APPARATUS FOR SEPARATING PARTICULATE MATTER FROM GASES

[75] Inventor: Joseph G. Wilson, Riverside, Conn.

[73] Assignee: Ingersoll-Rand Company, Woodcliff Lake, N.J.

[21] Appl. No.: 322,358

[22] Filed: Nov. 18, 1981

Related U.S. Application Data

[63] Continuation of Ser. No. 210,299, Nov. 25, 1980, abandoned, which is a continuation of Ser. No. 92,343, Nov. 8, 1979, Pat. No. 4,279,624, which is a continuation of Ser. No. 947,173, Sep. 28, 1978, abandoned.

[51] Int. Cl.³ .............................................. B01D 45/12
[52] U.S. Cl. .......................................... 55/1; 55/343; 55/347; 55/431; 55/DIG. 14; 209/144
[58] Field of Search ................. 55/1, 343, 346–349, 55/414, 431, 456, 457, DIG. 14, 17; 209/144; 210/512.2

[56] References Cited

U.S. PATENT DOCUMENTS

| | | | |
|---|---|---|---|
| 1,338,143 | 4/1920 | McGee | 55/1 |
| 2,941,621 | 6/1960 | Dygert et al. | 55/327 |
| 2,985,516 | 5/1961 | Trave et al. | 55/393 |
| 3,477,569 | 11/1969 | Klein et al. | 209/144 |
| 3,707,830 | 1/1973 | Gustausson | 55/457 |
| 3,917,568 | 11/1975 | Klein et al. | 209/144 |

FOREIGN PATENT DOCUMENTS

| | | | |
|---|---|---|---|
| 949211 | 8/1956 | Fed. Rep. of Germany | 55/343 |
| 632551 | 1/1928 | France | 55/431 |
| 626809 | 8/1978 | U.S.S.R. | 55/348 |

Primary Examiner—David L. Lacey
Attorney, Agent, or Firm—B. J. Murphy

[57] ABSTRACT

The method involves conducting the gas through a plurality of particulate matter separating stations, serially. In each station the gas is centrifuged in an annular channel and then turned inwardly, to leave particles behind and conduct the particle-removed gas away therefrom. In the successive stations, the gas is centrifuged or swirled with differing force levels, and particles of differing sizes are separated out.

The apparatus comprises a vessel in which are positioned a plurality of serially arranged separating stations. Each station has vanes for imparting a swirling, centrifugal motion to gas introduced into the vessel, and annular channels along which to conduct the swirling gas. Each station has a central, slotted tube, concentric with the channel, through which to vent the particle-separated gas, and the annular channels have terminations which define repositories for separated particles.

22 Claims, 9 Drawing Figures

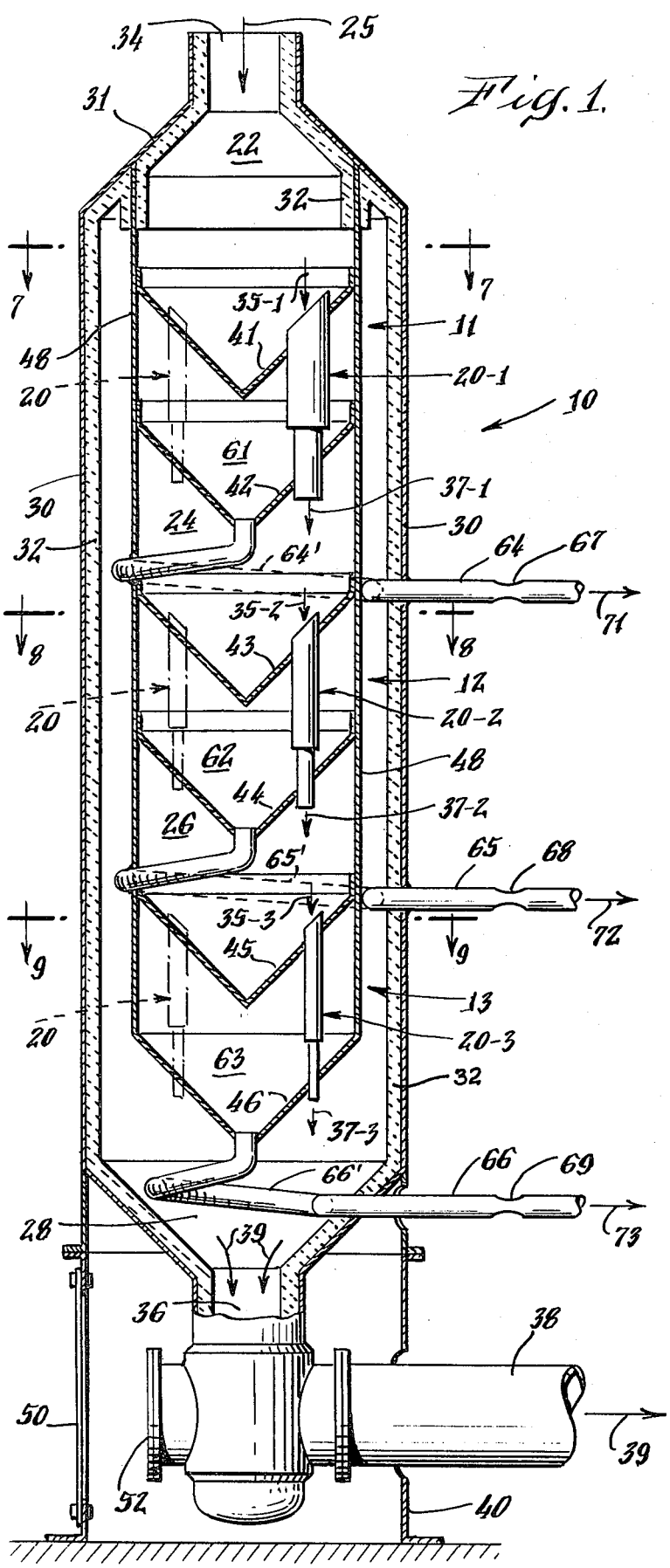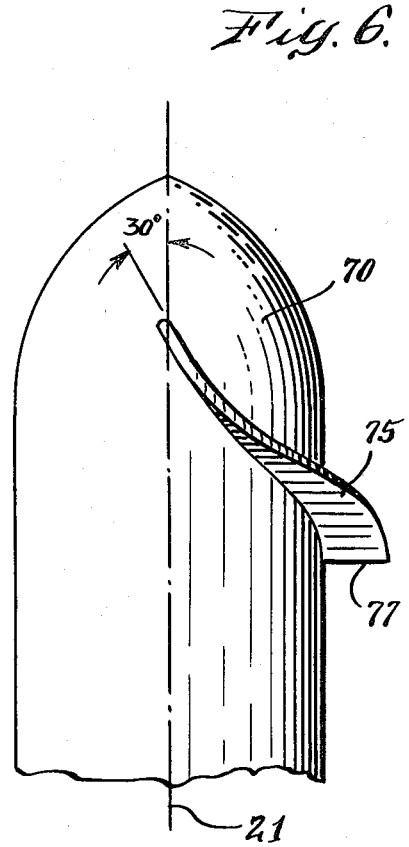

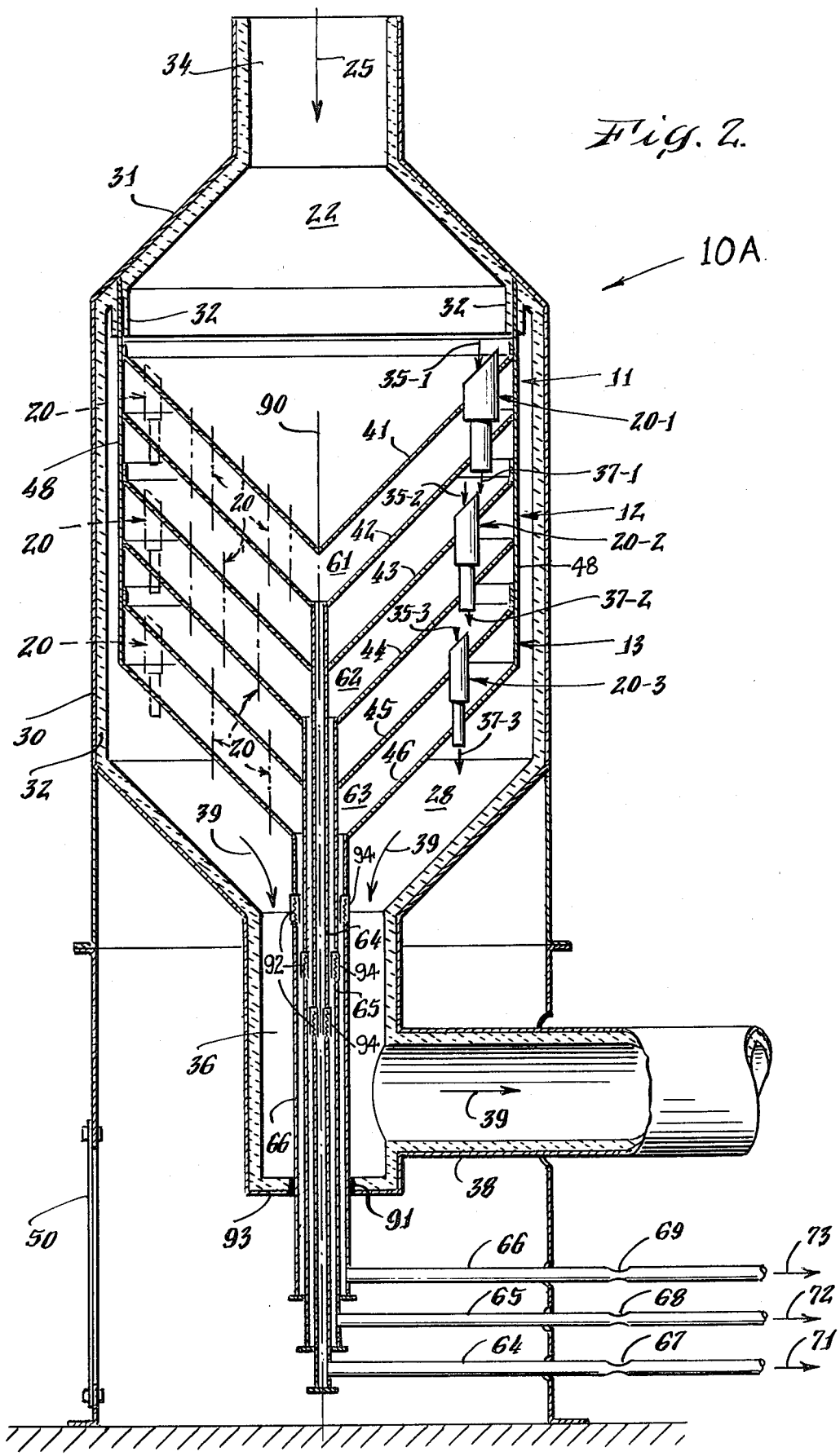

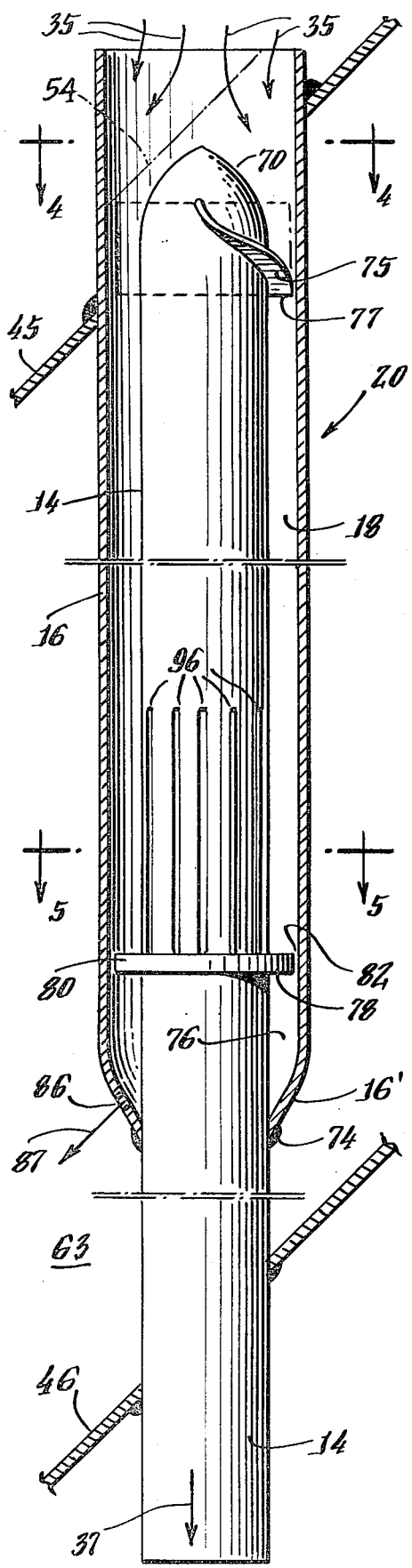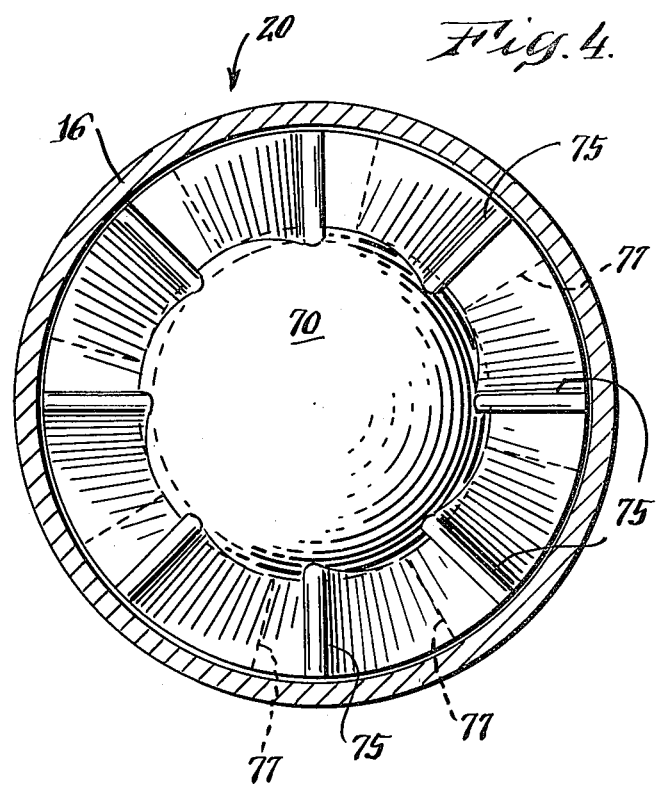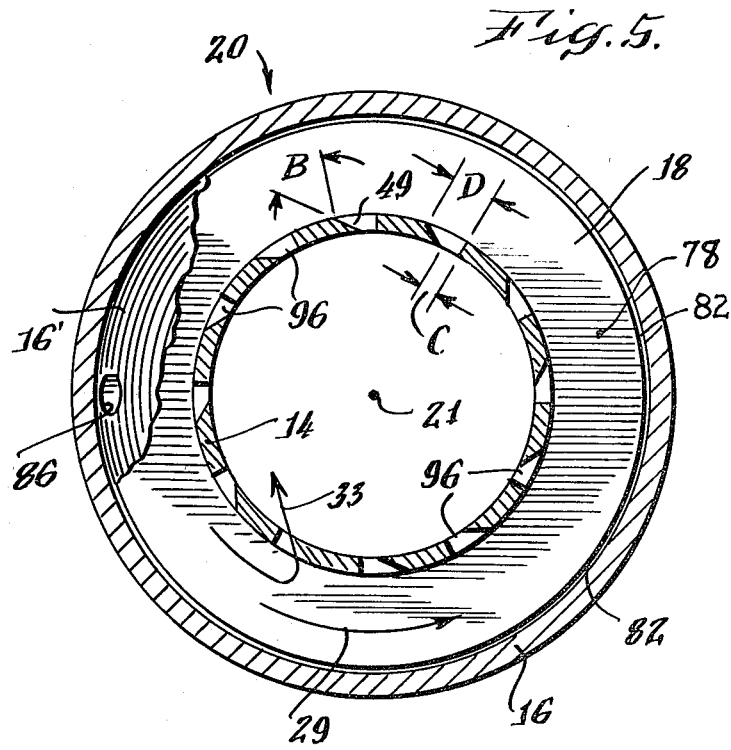

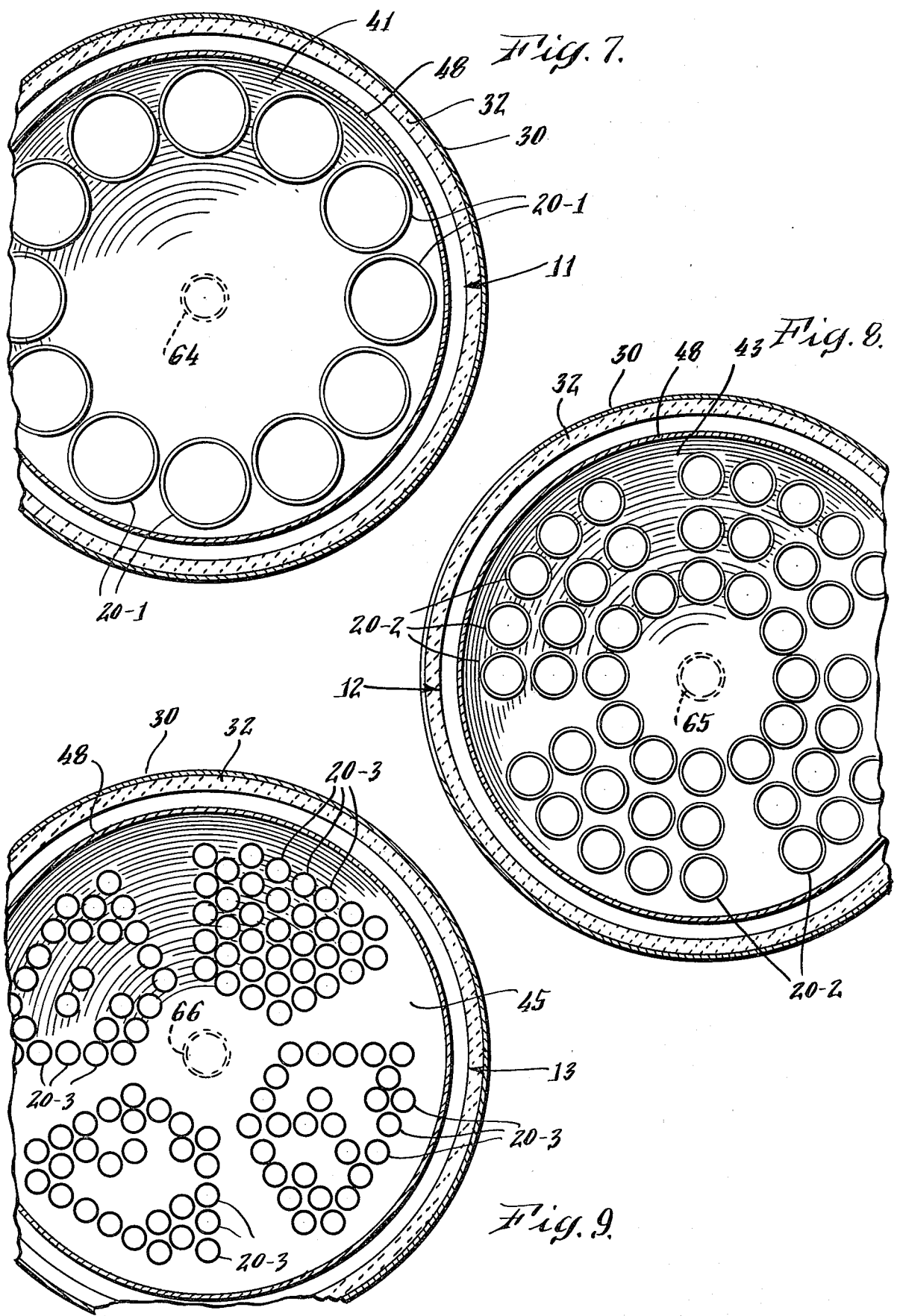

MULTI-STATION DOWNFLOW CENTRIFUGAL SEPARATION METHOD AND APPARATUS FOR SEPARATING PARTICULATE MATTER FROM GASES

This application is a continuation, of application Ser. No. 210,299, filed Nov. 25, 1980, now abandoned; Ser. No. 210,299 is a continuation of my patent application Ser. No. 092,343, filed Nov. 8, 1979 and issued as U.S. Pat. No. 4,279,624 on July 21, 1981; and Ser. No. 092,343 is a continuation of my patent application Ser. No. 947,173 of Sept. 28, 1978 which is abandoned.

BACKGROUND

Downflow centrifugal separator units of the type having an outer tube and a concentric inner tube defining an annular passageway therebetween and with slots in the lower portion of the inner tube and a separator vessel containing such units are described in detail and claimed in my prior copending application Ser. No. 092,343, filed Nov. 8, 1979, now U.S. Pat. No. 4,279,624, which is a continuation of application Ser. No. 947,173, filed Sept. 28, 1978.

The present invention relates to a multi-station downflow centrifugal separation method and apparatus in which improved downflow centrifugal separator units of the type described and claimed in said copending patent application are employed in a sequence of units of decreasing diameters positioned in a sequence of stations or levels (tiers) in a large separator vessel and wherein the particulate-laden gas enters the top of the large vessel and purified gas exits from the bottom of this vessel with bleed gas plus collected particles being continuously removed from each of these levels.

Separator vessels embodying the present invention are particularly useful for separating particles of catalyst from hydrocarbon vapors issuing from a catalytic cracking process and can also be advantageously utilized in other applications such as for removing suspended solids from the gaseous products of combustion coming from pressurized fluidized bed combustion of pulverized solid fuel for cleaning these gases before they are fed into a gas turbine. The multi-station downflow centrifugal separation method and apparatus of this invention are useful for separating particles from the gases resulting from coal gasification and liquefaction, and for use with supercharged boilers.

Highly efficient separation of particles as provided by the present invention is quite important for air pollution control purposes and power generation purposes. Active large catalyst particles can advantageously be recovered and reused by this separation. Furthermore, purified clean gas from a multi-station (multi-tier) downflow centrifugal separator vessel embodying this invention can be used to drive a turbine for generating valuable power and without any significant erosion of the turbine blades, which would otherwise be caused if many particles of unduly large size were present in the gas stream being fed into the turbine. It turns out in actual practice that the blades of a turbine will experience excessive erosion if there are any significant numbers of particles ten microns in size or larger in the gas stream entering the turbine. A multi-station downflow separator vessel embodying this invention will effectively remove particles down to a size of six microns and even smaller from a gas stream.

The prior art separator vessels containing multiple tubular type units, for example as shown in U.S. Pat. No. 2,941,621, are not very effective in maintaining high fractional separation efficiencies due to "coupling" effects between the respective tubular separator units operating in parallel in the vessel as a whole. Such "coupling" effects cause the particle discharge from one tubular unit in the vessel to flow in a reverse direction into what would normally be the particle discharge of a second tubular unit neighboring the first. Thereby separated particles of various sizes which are separated by the first unit find their way into what would normally be the clean gas outlet of the second unit, and contaminate the output of the whole prior art vessel. Consequently, in the output of the prior art separator vessel, there are significant numbers of larger particles. The separation and removal of all particles larger than the intended maximum permitted particle size has not in fact occurred, even though the tubular units in the vessel when individually tested will remove all particles larger than said permitted size.

This failure in actual practice to remove all particles larger than a given permitted maximum size is called a failure to maintain high fractional separation efficiencies. The results of this failure in the prior art to maintain high fractional separation efficiencies are far more deleterious than appear at first glance, because the abrasion and erosion caused by relatively few larger particles are many, many times greater than those caused by numerous smaller particles of a size below the maximum desired limit.

The fractional separation efficiencies provided and maintained by the separator vessel described in detail and claimed in said prior copending application (now U.S. Pat. No. 4,279,624) identified above are high, and the fractional separation efficiencies provided and maintained by the multi-station downflow centrifugal separator vessel described herein may be even higher, when careful design of all stations is practiced.

As explained above, multi-station downflow separator vessels of this invention can be used to advantage for separating particles from gases in a wide variety of applications in addition to purifying a gas stream for entry into a turbine.

SUMMARY

A multi-station downflow centrifugal separator vessel in accordance with the present invention includes a plurality of individual separator units at a plurality of different stations (levels or tiers) in the vessel. Each separator unit includes a vertical inner tube, a concentric vertical outer tube, with an annular channel defined between the inner and outer tubes, the inner and outer tubes comprising walls of the channel. Slots are located in the lower portion of the inner tube, and swirl vanes mounted near the top of the annular channel produce a swirling motion of the particle-laden gases flowing downwardly through the annular channel above the slots.

Gas laden with particulate matter is introduced into the top of the separator vessel and swirls down through the annular channels of the individual separator units in the respective stations (levels) in sequence. As a result of the centrifugal force generated by the swirling flow of the gas, the particulate matter is separated from the gas in the annular channels of the individual separator units, with the gas then suddenly changing direction and flowing inwardly through the slots in the inner tubes and thereafter exiting from the lower ends of these tubes, while most of the particulate matter, together with a minor amount of bleed gas, exits from the lower ends of the respective annular channels.

The individual separator units are arranged within the separator vessel in two or more distinct stations or tiers (levels). A first upper station includes a plurality of larger diameter separator units each having a relatively large cross-sectional flow area. A second (intermediate) station is located below the first station and may include a larger number of individual separator units than the first station, with the flow area of the units in this second station being smaller than those in the first station, in which event the flow velocity through the units in the second station is considerably greater than in the first station. A third station located below the second station may include the largest number of individual separator units, with the diameter and total flow area of the separator units in this third station being less than those in the second station, in which event the flow velocity through the units in the third station is considerably greater than through the units in the second station.

By virtue of the progressively smaller diameters of the centrifugal separator units in the successive stations, the centrifugal forces are correspondingly increased in the units in the successive stations for effectively centrifugally removing particles of lesser and lesser size (lesser mass). Moreover, in installations where the velocities of the gas flowing down through the smaller diameter separator units in later stations are greater than in the earlier stations, then even a further enhancement of the centrifugal separating action is obtained.

As gas laden with particulate matter flows downwardly through the separator units in the sequential stations in the separator vessel larger (more massive) particles are separated by the units in the first station, smaller particles are separated by the units in the second station, and the relatively smallest size (least massive) particles are separated by the units in the third station. A discharge passageway is provided to discharge the purified gas from the third station out of the separator vessel, so that the resulting purified gas which is essentially free of all but the very smallest particles can be advantageously utilized to drive a turbine or perform other useful functions.

Among the advantages of removing the more massive particles in the larger diameter units in preceding stations, are those resulting from the fact that there is reduced abrasion and consequent increased operating life in the smaller diameter units of succeeding stations, wherein greater velocities and centrifugal forces are involved for effectively removing all but the smallest sizes of particles.

Among the further advantages of a multi-station downflow centrifugal separation vessel embodying the present invention are those resulting from a very high overall fractional separation efficiency which is provided and maintained from input to output. A high fractional separation efficiency is provided and maintained by the multiple units in each station, and then the resultant collected particles and bleed gas are removed from each station individually. Therefore, there is no possible contamination being transferred from one station to the next, and consequently the overall separation efficiency of the overall vessel containing three stations (three levels or tiers) in sequence is very high.

BRIEF DESCRIPTION OF THE DRAWINGS

Further features, aspects, objects and advantages of the present invention will become more fully understood from a consideration of the following detailed description of presently preferred embodiments in conjunction with the accompanying drawings in which corresponding reference numbers indicate similar elements throughout the various Figures. The drawings are arranged for clarity of illustration and are not necessarily drawn to scale.

FIG. 1 is an elevational sectional view taken along the vertical axis of a multi-station (multi-level) downflow centrifugal separator vessel containing three stations of vertical tubular centrifugal separator units, with a different respective diameter of units in each station;

FIG. 2 is an elevational sectional view taken along the vertical axis of another multi-station downflow centrifugal separator vessel containing three stations of vertical tubular centrifugal separator units having a different respective diameter for the units in each station. The outlet conduits for removing the separated particles together with some bleed gas are concentrically arranged for reasons as will be explained later.

FIG. 3 shows an elevational sectional view of one of the centrifugal separator units, being considerably enlarged as compared to the units shown in FIG. 1 or FIG. 2.

FIG. 4 is an enlarged cross-sectional view taken along the line 4—4 in FIG. 3, as seen looking downwardly and showing a top view of the swirl vanes;

FIG. 5 is an enlarged cross-sectional view taken along the line 5—5 in FIG. 3, as seen looking downwardly and showing a presently preferrred configuration and arrangement of the slots in the inner tube;

FIG. 6 is an enlarged elevational view of the streamlined nose on the inner tube and shows one swirl vane for clarity of illustration; and FIGS. 7, 8 and 9 are similar plan sectional views looking down at the three respective stations in FIG. 1 and showing the arrangement of the centrifugal separating units in each station. FIGS. 7, 8 and 9 are taken along the lines 7—7, 8—8 and 9—9, respectively in FIG. 1 and are enlarged plan sectional views.

DETAILED DESCRIPTION

Referring to FIG. 1 of the drawings, a novel multi-station or multi-level downflow centrifugal separator vessel 10 advantageously includes three vertically spaced stations 11, 12 and 13, and each of these stations includes a plurality of centrifugal separator units 20 of the type generally shown in FIG. 3. Each unit includes a vertical inner tube 14 and a concentric vertical outer tube 16 defining an annular channel 18 between them. It is to be understood that the size of this annular channel 18 is determined by the dimensions of the walls thereof, i.e., by the inside diameter (I.D.) of the outer tube and by the the outside diameter (O.D.) of the inner tube. Therefore, when tube diameters are being described, it is to be understood that the I.D. of the outer tube and the O.D. of the inner tube are those dimensions being described.

The upper station 11 contains large size units 20-1. The intermediate station 12 contains more numerous intermediate size units 20-2, and the lower station 13 contains most numerous small size units 20-3.

There are, for example, twelve large units 20-1 in the upper station 11, each unit having a 24 inch I.D. outer tube and a 16 inch O.D. inner tube. The intermediate station, for example, contains forty eight intermediate size units 20-2. Each intermediate unit 20-2 has a 12 inch I.D. outer tube and an 8 inch O.D. inner tube. The lower station, for example, contains one hundred and forty four small size units 20-3, each small unit having a 6 inch I.D. outer tube and a 4 inch O.D. inner tube.

In this illustrative embodiment, which is one of the presently preferred arrangements for placing this invention into practice there is a geometric relationship between these tube sizes. In each unit, the inner tube is ⅔rds of the size of the outer tube. Moreover, the inner and outer tubes in the intermediate units 20-2 in the intermediate station 12 have ½ the size of the respective tubes in the large units 20-1 in the upper station 11. Further, the inner and outer tubes in the small units 20-3 in the lower station 13 have ½ the size of the respective tubes in the intermediate units 20-2. There will be an explanation further below of the advantageous relationship of the magnitudes of the centrifugal forces which are developed in these various size units.

Inviting attention back to the vessel 10, it has an outer steel shell 30 with a layer of heat resistant insulation 32 affixed to the interior of this outer shell. A necked down inlet passage 34 is formed at the top of the vessel and a similar necked down outlet passage 36 is formed at the bottom of the vessel.

This outside pressure bearing shell 30 contains an inner shell 48 in which the three stations 11, 12 and 13 are located. Each of these stations includes upper and lower conically shaped tube sheets with the separator units extending vertically through and being secured to both tube sheets and acting like struts for strengthening the tube sheets. The upper and lower tube sheets in the upper station 11 are indicated at 41 and 42. The upper and lower tube sheets in the intermediate station 12 are indicated at 43 and 44, while the upper and lower tube sheets in the lower station 13 are indicated at 45 and 46. These tube sheets 41-46 are each secured at their perimeters in vertically spaced relationship to a the inner shell 48. This inner shell 48 is concentric with the outer bearing shell 30 of the vessel 10 and is spaced inwardly from the insulation lining 32 in the shell. At the top, the inner shell 48 is attached to a conical top portion 31 of the outer bearing shell 30. Thus, the inner shell 48 hangs in tension, and the respective pairs of tube sheets 41, 42 and 43, 44 and 45 46 in the three respective stations are supported by this inner shell 48 from the top portion 31 of the outer bearing shell 30. The top portion of the inner shell 48 is protected by thermal insulation 32 to reduce thermal stress therein. The insulation 32 of the inner shell 48 is desirable because, in operation, the interior of the vessel 10 can achieve temperatures of up to 1500° F. to 1550° F. The insulated outer bearing shell 30 which carries a substantial pressure for example in the range from 20 psi up to 150 psi or even more for power generation purposes, is maintained significantly cooler in the range of 300° F. to 400° F.

As a result of the advantageous inner shell 48 for the three stations 11, 12, 13, one above another in vertical alignment, the thermal expansion and contraction of the respective tube sheets 41-46 are readily accommodated, and no resultant stress is transferred from these tube sheets to the vessel outer bearing shell 30. Furthermore, the individual separator units 20-1, 20-2 and 20-3 extend through and are secured to the respective pairs of tube sheets 41, 42 and 43, 44 and 45, 46, thereby acting as stiffening struts for sparing the load of the total weight of the three stations 11, 12 and 13 and for bearing the forces resulting from the differential pressure across each station. The surfaces of these conical tube sheets all slope inwardly and downwardly and are all inclined at a 45° angle to the horizontal for reasons which will be explained later.

The resultant three-station cylindrical structure 11, 12, 13 including the hanging inner shell 48 can be made of relatively thin metal, usually stainless steel to meet the temperature requirements, and to conserve materials and costs; and yet the overall structure is suitably strong to resist gravitational stress and to resist stresses due to pressure differentials caused by the voluminous flow of particulate-laden gas 25 which is being cleaned.

The incoming particulate-laden gas 25 flows directly down into an inlet chamber 22 located above the upper station 11. By virtue of the unobstructed open configuration of the inlet chamber 22, the pressure is substantially uniform in the particulate-laden gas throughout this chamber. Consequently, the inlet pressures to all units 20-1 are all essentially identical and also their outlet pressures are all substantially identical, as will be discussed below.

The particle-laden gas flows directly down into each of the first-station separator units 20-1, as shown by the arrow 35-1. The gas exits from each of the first-station separator units by flowing directly down, as shown by arrow 37-1, from the lower end of each separator unit into an upper intermediate chamber 24.

By virtue of the open unobstructed configuration of this upper intermediate chamber 24, the pressure of the gas is substantially uniform throughout this chamber. Thus, the output pressure for all of the large separator units 20-1 is essentially identical as discussed above for contributing to their uniformity of operation. Thus, also the inlet pressure of the gas flow 35-2 entering each of the intermediate separator units 20-2 is essentially the same.

Advantageously, the pressure differential of each of the separator units 20-2 in the intermediate station 12 is substantially identical with others in this station, because its inlet pressure is the same as that for all of the others in this station, as discussed above, and its outlet pressure is substantially identical to that of all of the others in this station.

As shown by the arrows 35-2, the gas flows directly down from the intermediate chamber 24 into each separator unit 20-2 and exits by flowing from the bottom, as shown by the arrow 37-2, entering a lower intermediate chamber 26.

Again, by virtue of the open and unobstructed configuration of this chamber 26, the pressure of the gas throughout is substantially uniform, thereby providing uniform outlet pressures for all of the intermediate separator units 20-2 and also providing uniform inlet pressures for all of the third-station separator units 20-3.

The flow of gas into and out of these third-station separator units is indicated by the arrows 35-3 and 37-3, respectively. The resultant "clean" gas 39 in the outlet chamber 28 flows directly down into the outlet passage 36. The clean gas 39 flows from the outlet passage 36 through an outlet duct 38 extending out through a structural support wall 40 having a removable access door 50. There is a removable access cover 52 for the outlet duct 38.

Between the first pair of tube sheets 41 and 42 is located a first particle-discharge chamber 61. The particles which are separated by each of the first-station units 20-1 enter this discharge chamber 61 as will be explained later, and are removed through a first discharge line 64, together with a predetermined amount of bleed gas. The mixture of bleed gas and separated particles being discharged through this line 64 is indicated by the arrow 71. It is noted that this first discharge line includes a first critical flow nozzle 67, the purpose of which will be described in detail later.

In order to accomplish the vertical (longitudinal) thermal expansion of the inner shell 48 relative to the outer bearing shell 30, the discharge line 64 is welded to the inner shell 48 and is welded to the outer bearing shell with an expansion accommodating loop 64' extending between these two welded connections.

Between the second pair of tube sheets 43 and 44 is located a second particle-discharge chamber 62. The particles removed by each of the second-station units 20-2 enter this chamber, as will be explained later, and are discharged therefrom through a second discharge line 65 including a second critical flow nozzle 68, the purpose of which will be described later. The mixture of bleed gas and separated particles being discharged through the line 65 is indicated by the arrow 72. This second discharge line 65 is similarly connected and is similarly provided with an expansion accommodating loop 65' as described above for the first discharge line 64.

Between the third pair of tube sheets 45 and 46 is located a third particle-discharge chamber 63. The particles which have been separated by each of the third-station units 20-3 enter this third chamber 63. These separated particles, together with a predetermined amount of bleed gas, are discharged from this third chamber 63 through a third discharge line 66 containing a third critical flow nozzle 69, the purpose of which will be explained later. The mixture of bleed gas and separated particles being discharged through the line 66 is indicated by the arrow 73. This third discharge line 66 is similarly connected and provided with an expansion accommodating loop 66', as described above for the other two discharge lines 64 and 65.

The larger sizes of particles are contained in the flow 71; the intermediate sizes of particles are in the flow 72; and the smallest range of sizes of particles are in the flow 73. There is no opportunity for contamination of the gas entering any subsequent station, because these flows 71, 72 and 73 are separately removed from each station, being isolated one from the other.

Inviting attention to the separator unit 20 shown in FIG. 3, it is noted that the construction of this unit is typical of all of the units 20-1, 20-2 and 20-3. The only differences between the various size units are the diameters of their inner and outer tubes and corresponding length of the tubes, in which the length of the annular passage 18 is approximately three times the diameter of the outer tube, and the resultant differences in sizes of the elements associated with these tubes as will be understood. For convenience of explanation, the unit 20 in FIG. 3 may be assumed to correspond with one of the third-station units 20-3.

The pair of supporting tube sheets 45 and 46 are positioned, respectively, towards the top and bottom of the centrifugal separator unit 20. These tube sheets receive and hold the upper and lower ends of the outer and inner tubes 16 and 14, respectively, which extend through appropriate size openings in the tube sheets and are welded thereto. The upper end of the outer tube may be horizontal or it may be cut off on a diagonal plane shown dashed at 54 with an inclination matching the inclination of the tube sheets (45° in this example) for conserving weight and for facilitating welding of the units to the respective tube sheets.

A streamlined nosepiece 70 effectively seals the top of the inner tube, while leaving the upper end of the annular channel 18 unobstructed. The lower end of this annular channel is closed by the inturned lower portion 16' of the outer tube 16 which is welded to the inner tube at 74, above the location of the lower tube sheet 46. The lower end of the inner tube 14 is open from which the downward flow 37 exits.

In the preferred embodiment as shown in FIG. 3, the upper and lower tube sheets, the nosepiece, and the inner and outer tubes of separator units in all three stations 11, 12 and 13 are formed of stainless steel.

The centrifugal separator 20 includes a series of swirl vanes 75 (See also FIG. 4) positioned in the annular channel 18 near the top thereof for providing a powerful swirling movement of the particle-laden gas 35 travelling downwardly within this annular channel. FIGS. 3 and 6 show only one of these vanes for clarity of illustration, but as shown in FIG. 4, there are a plurality of these vanes, in the range from four to twelve in number. FIG. 4 shows eight such swirl vanes 75.

An annular bleed chamber 76 for receiving the separated particles, and for allowing a flow of bleed gas to occur, is located in the lower portion of the annular channel 18. This chamber 76 is defined by the inturned lower portion or closure 16', the outer surface of the inner tube 14, and a ridge member 78 mounted on the inner tube and having an outer rim 80 closely spaced from the outer tube.

The ridge member 78 extends transversely from the outer surface of the inner tube 14 towards the inner surface of the outer tube 16. The radial extension of this ridge member is slightly less than the radial spacing between the inner surface of the outer tube and the outer surface of the inner tube. Thus, the rim 80 of this ridge member 78 and the inner surface of the outer tube 16 define a narrow passageway 82 therebetween which leads downwardly into the bleed chamber 76. The ridge itself can be either transverse or sloped downwardly and outwardly relative to the surfaces of the inner and outer tubes.

Particulate material which has descended through the narrow passageway 82 into the separation chamber 76 is removed therefrom via a discharge port 86 formed in the lower portion or closure 16'. The discharge port 86 is of a sufficient size to maintain a 0.1 to 0.15 psi pressure differential between the gas within the bleed chamber 76 and the third particle discharge chamber 63 (or 62 or 61, as the case may be) outside of the outer tube. The relative size of the ports 86, in cooperative interaction with the respective critical flow nozzles 67, 68, 69, controls the amount of bleed gas discharged from the individual bleed chambers 76 into the common particle discharge chamber 63 or 62 or 61.

By virtue of the fact that the pressure within the common particle discharge chamber 63, 62 or 61 is purposefully maintained at a predetermined differential pressure, e.g. 0.1 to 0.15 psi, below the pressure in the upstream bleed chamber 76, the outward flow 87 does not inadvertently reverse in the event of small pressure differences occurring among the annular channels 18 in a plurality of separator units 20. Also, as indicated above, any variations in pressure occurring within the annular chamber 18 of the individual separator units 20 are prevented from coupling with pressure variations in adjacent separator units 20 by said difference in pressure intentionally maintained between each bleed chamber 76 and the common particle discharge chamber 63, 62 or 61.

The particulate matter and particle gas in the common bleed discharge chambers 63, 62 and 61 are removed through the respective discharge lines 66, 65 and 64. Each critical flow nozzle serves to control the total mass flow of bleed gas from all of the separator tubes 20 in a given station, with each individual port 86 contributing its proportionate share to the total mass flow of the bleed gas from that station. The pressure differential across each port 86 is controlled by the mass of bleed gas 87 flowing through that port, which is itself controlled by the total mass flow 73, 72 or 71 of bleed gas flowing through the respective critical flow nozzle 69, 68 and 67. This total mass flow 73, 72 or 71 will be a constant value for each discharge line 66, 65 or 64 for a given set of operating conditions.

A series of circumferentially spaced, axially extending slots 96 (See also FIG. 5) are formed just above ridge 78 in inner tube 14. These slots allow gas swirling within and axially through the annular chamber 18 to enter into the inner tube, producing a sudden change in direction of flow, causing the swirling flow 29 suddenly to turn inwardly into the inner tube. More efficient results are obtained when the slots are positioned as shown in the lower portion of the inner tube 14, because a relatively long and uninterrupted annular channel 18 is thereby provided extending downwardly from the lower lip 77 of the swirl vanes 75 to the upper ends of the slots 96. These slots 96 are relatively short compared to the length of the annular channel as measured from the lower lips 77 of the swirl vanes 75 to the upper side of ridge 78. For example, these slots may have a length in the range from 15% to 40% of the annular channel length. In this example, these slots have a length approximately equal to 25% of the channel length from the vane lips 77 down to the top of ridge 78. These slots are proportioned to provide a relatively large open area through which the suddenly inturning gas flow 33 (FIG. 5) can occur without too high a pressure drop occurring.

As shown in FIG. 5, and as will be further discussed below, the slots 96 cause a sudden change in the direction of flow of the gas which was previously swirling flow, as shown by the arrow 29 around the inner tube 14 and then suddenly enters the slots, in an altered flow direction 33 thereby suddenly producing a radial component of flow. The degree of change of direction of flow and the extent of the suddenness of this change depend on the specific configuration of the slots 96 and their positioning in the lower portion of the inner tube 14.

In operation of the centrifugal separator units 20, gas laden with particles flows, as shown by the arrows 35, into the open top of the annular channel 18. By the action of the swirl vanes 75 which are curved in the axial direction like turbine blades, they impart a powerful swirling movement, as shown by the arrow 29 (FIG. 5), to the entering gas causing the gas to revolve in the annular channel 18 around the inner tube. The centrifugal force of the swirling motion, as indicated by the arrow 29, causes the particles to be thrown outwardly against the inner surface of the outer tube 16. This initial separation of particles produced by the powerful swirling motion initially imparted to the downflowing gas by the swirl vanes is effectively a first stage of separation.

After this initial or first stage of centrifugal separation has occurred, the rapidly swirling gas movement, which is continually descending in the relatively long annular channel 18 causes further centrifugal separation to occur. This further centrifugal separation occurring along the relatively long annular channel 18 is effectively a second stage of separation for separating further particles not previously separated.

After swirling down through this relatively long annular channel 18, the gas reaches the proximity of the slots 96 in the inner tube, and the gas experiences a sudden change to a somewhat generally radial direction of flow as shown by arrow 33. This rapid change of direction of the gas stream results in a further separation of smaller particles which were not separated when the gas entered and swirled through the annular channel. Such further separation, occurring during the sudden change in flow direction from that indicated by arrow 29 to the direction indicated by arrow 33 is effectively a third stage of separation, with the separated particles continuing to swirl in the channel 18. All of the separated particles, together with the flow of bleed gas, pass down through the narrow passageway 82 into the bleed chamber 76 and are discharged through the port 86 as described above.

After all three of the separation stages have occurred, the main stream of gas enters through the slots 96, flows in the same, original, axial flow direction again down through the bottom of the inner tube and exits as indicated by the arrow 37, from the bottom of the separator unit 20 through the lower open end of the inner tube. The gas in inner tube 14 is prevented from flowing in the opposite axial direction due to the closure thereof, at the upper end, by nosepiece 70.

As seen in FIG. 5, there are twelve slots 96 uniformly spaced in the wall of the inner tube, i.e. being angularly spaced 30° apart around the axis 21 of the centrifugal separator unit 20. These slots have a width "C" of $\frac{1}{4}$th of an inch at their interior where they communicate with the bore of the inner tube, and they have a width "D" of $\frac{1}{2}$ of an inch at their exterior where they communicate with the annular passage 18. As shown in FIG. 5, the downstream side or edge 49 of the respective slots 96 is sloped in an opposed direction to the swirling flow, indicated by the arrow 29, at an angle "B" of approximately 60° to a radial line at the outer extremity of the respective side 49, thereby providing a very sudden change in the diretion of flow, as indicated by the arrow 33, of the gas entering into the inner tube 14.

The single discharge port 86 for the bleed gas flow as indicated by arrow 87 (FIG. 3) is also seen in FIG. 5. This port 86 has a diameter of 0.5 inch, and it is aimed downwardly at an inclination generally corresponding to the tube sheets being aimed generally toward the mouth of the discharge line 64, 65 or 66, as the case may be.

By virtue of having the flows as indicated by arrow 87 of particle-laden bleed gas aimed, somewhat like jets, downwardly along the respective conical tube sheet, they help to propel the particles downwardly along the inclined lower tube sheet 42, 44 or 46 toward the mouth of the respective discharge line 64, 65 or 66.

The narrow annular passageway 82 located between the inner surface of the outer tube and the periphery 80 (FIG. 3) of the ridge member 78 is not critical as to radial width. Its radial width may be of the size of ¼ of an inch or more.

As seen in FIG. 4, this centrifugal separator unit 20 includes eight of the swirl vanes 75. These swirl vanes 75 are secured to the upper end of the inner tube and also to the nosepiece 70. For ease of assembly of the unit 20, these swirl vanes are not secured to the inner surface of the outer tube 16, instead there is a very small clearance, say of the order of 0.02 of an inch, or less, between each of the swirl vanes and the I.D. of the outer tube.

FIG. 6 shows an enlarged view of the streamlined nosepiece 70 and one of the swirl vanes 75. It is noted that the leading edge of each swirl vane is sloped in the swirl direction at an angle of approximately 30° with respect to a vertical line parallel with the axis 21 of the centrifugal separator unit 20. The discharge lip 77 of each swirl vane 75 is at an angle of approximately 30° to the horizontal at a point near the inner surface of the outer tube. Thus, the particle-containing gas is spouted into the annular channel 18 with a vigorous spouting velocity flow, for example, in the range from 60 to 250 feet per second. This spouting velocity is not critical, keeping in mind that the faster the spouting velocity, the more effective the particle separation for a given size (mass) of particles.

FIG. 7 shows a top plan view of the twelve first-station separator units 20-1 (FIG. 1) uniformly circumferentially spaced around the mouth of the first discharge line 64. The number of these units 20-1 is not critical; however, there should be a sufficient number that their combined total cross-sectional flow areas will accommodate the total gas flow, as indicated by the arrow 25 (FIG. 1), with only a modest pressure drop.

FIG. 8 shows a top plan view of the fifty-four second-station separator units 20-2 (FIG. 1) spaced around the mouth of the second discharge line 65. The number of these units 20-2 is not critical. They should be sufficient in number to accommodate the total gas flow, as indicated by the arrow 25, with only a modest pressure drop. In view of the fact that their individual cross-sectional areas are, in this example, only one-fourth the size of the corresponding cross-sectional flow areas of the individual first-station units 20-1, then generally speaking there are approximately four times as many, namely, forty-eight of these second-station units 20-2. If it is desired that the flow velocity through these second-station units be greater than through the first-station units, there will be less than four times as many. Namely, for greater flow velocity the sum of their cross-sectional areas will be less than the sum of the cross-sectional areas of the first-station units.

FIG. 9 shows a top plan view of the third-station separator units 20-3 (FIG. 1) arranged around the discharge line 66. Again, their number is not critical, but for reasons as discussed above, there are approximately four times the minimum number of second-station units 20-2; in other words, approximately 144 of them. However, if it is desired that the flow velocity through these third-station units be greater than through the second-station units, then their number will be less than four times as many.

In this example, there are 48 of the second-station units 20-2 and 144 of the third-station units 20-3.

ASPECTS AND ADVANTAGES OF MULTI-STATION DOWNFLOW SEPARATION METHOD AND APPARATUS

The separator units 20-1, 20-2 and 20-3 are mounted within the separator vessel in a three-tiered arrangement 11, 12 and 13 to enhance the overall separation efficiency without undue wear due to erosion by providing particle separation in three ranges of particle sizes being removed in the respective separate and mutually isolated bleed flows which are indicated by the arrows 71, 72 and 73.

Centrifugal force on a particle of mass "m" is proportional to the square of its tangential velocity "V" and inversely proportional to the average radius "R" in the annular channel 18, as shown by the following equation:

$$\text{Centrifugal Force} = mV^2/R \tag{1}$$

This tangential velocity "V" is the velocity along a tangent to the arrow 29 in FIG. 5. This tangential velocity is approximately proportional to the "spouting velocity", which is the velocity at which the particle-laden gas stream spouts or shoots away from the downstream lips 77 of the swirl vanes 75.

From this equation (1), it is seen that the centrifugal force on a given particle of mass "m" can be increased in two ways: (1) by increasing the spouting velocity and thereby increasing the tangential velocity "V", and (2) by decreasing the average radius "R" of the annular channel 18. In other words, generally speaking the centrifugal separating effect is increased by increasing the spouting velocity and/or by decreasing the radial size of the tubular separator units. However, too high "V" may lead to unacceptable pressure differential (pressure drop across a station), and thus desired objectives are met by a suitable inter-relationship of V and R.

An additional force acting on each particle due to the aerodynamic drag of the gas stream on the particle is a function of the projected area of the particle and is proportional to the square of the "equivalent" diameter of the particle. This drag force tends to make the particle follow the direction of the gas stream and, therefore, this drag force is working against the desired centrifugal force. These are complex relationships, and the efficiency of a given centrifugal separator is established by emperical test results with the specific particles and gas involved and not by theoretical analysis.

Although the gas-borne particles are often quite irregular and of various shapes, it will be understood that the volume "v" and the mass "m" of any given particle is a function of the product of its three linear dimensions: length, width and height, in effect being a cube function (third power function) of linear dimension. In the case of a spherical particle of diameter "d" its volume is:

$$\text{Volume} = (\pi d^3/6) \tag{2}$$

Consequently, the mass "m" is also a third power function of the diameter "d".

Therefore, generally speaking, a particle having one-half of the length, one-half of the width, and one-half of the height of a second particle has one-eighth of the volume and one-eighth of the mass of the second particle. Consequently, generally speaking, such a smaller particle is eight times more difficult to separate from a gas stream than the second, due to mass effects alone, but in addition the aerodynamic drag forces on the smaller particle (which are larger relative to its mass than for a larger particle) make the smaller particle proportionately even more difficult to separate.

In other words, a particle of six micron size is considerably more than eight times more difficult to remove from flowing gas than a particle of twelve micron size for a given spouting velocity and a given radius of travel "R".

By virtue of having the multi-station arrangement as shown, the ranges of larger sizes of particles which cause the most abrasive wear, are removed by the centrifugal separator units 20 in the earlier station and ranges of smaller sizes of particles are removed by the separator units 20 in the later stations. Thus, a high overall separating efficiency is provided by the vessel 10 or 10A (FIG. 2) as a whole but the wear occurring in units in the subsequent stations is dramatically reduced from that which would occur if an attempt were made to remove all ranges of sizes of particles by units in one station.

MULTI-STATION EMBODIMENT WITH CENTRIFUGAL SEPARATOR UNITS ALL OF THE SAME SIZE

As an alternative to having units 20-1, 20-2 and 20-3 of different radii in the respective stations 11, 12 and 13, the units 20-1, 20-2 and 20-3 may all have the same radius, but the spouting velocity may be arranged to be least in the units in the first station 11, of intermediate velocity in the units in the second station 12, and of greatest velocity in the units in the third station 13. This difference in spouting velocity with units all of the same radius is accomplished by having different numbers of units in the respective stations, because the spouting velocity is an inverse function of the number of separator units in a given station, when the separator units are all of the same size. Thus, in this embodiment where all of the centrifugal separator units are of the same size, there are more units in the first station 11 where the spouting velocity is least, an intermediate number of units in the second station 12 where the spouting velocity is intermediate and the fewest units in the third station where the spouting velocity is greatest. Once again, the ranges of larger sizes of particles, which cause the most abrasive wear, are removed by the separator units in the earlier station and ranges of smaller sizes of particles are removed by the separator units in the subsequent stations. Thus, once again a high overall separating efficiency is provided by the vessel 10 or 10A as a whole, but the wear occurring in units in the subsequent stations is dramatically reduced from what would occur if an attempt were made to remove all ranges of sizes of particles by units in one station.

Moreover, the particles are separately removed from each station 11, 12 and 13. Therefore, there is no opportunity for contamination of the gas in subsequent stations to occur from separated particles because the separated particles are intentionally isolated from subsequent stations.

If desired, the diameter of the vessel bearing shell 30 and of the inner shell 48 can be made larger around the first station 11 when the units in all stations are the same size and are most numerous in the first station.

As an example, in this embodiment as shown dotted at the left in FIG. 1 where all of the units 20 are of the same size, for example, with an inner tube O.D. of four inches and an outer tube I.D. of six inches, the flow through the respective units 20 in the first, second and third stations can be arranged to be: three hundred cubic feet per minute per first-station tube; four hundred cubic feet per minute per second-station tube; and five hundred cubic feet per minute per third-station tube. These values are not critical, but they provide the reader with an understanding of the orders of magnitude involved.

The multi-station downflow separator vessel 10A shown in FIG. 2 is similar to that shown in FIG. 1, except that the discharge lines 64, 65 and 66 for the particle-laden bleed gas are concentric and extend downwardly along the axis 90 of the vessel 10A for accommodating thermal expansion. The discharge line 64 for the first station 11 is coaxial within the discharge line 65 for the second station 12 which, in turn, is coaxial within the discharge line 66 for the third station 13.

Above the location where the concentric discharge lines 64, 65, 66 pass down through the sealed opening 91 in the bottom 93 of the bottom outlet portion 36 of the vessel shell 30 there are expansion accommodating bellows 92 in each of lines 64, 65, 66 with shroud 94 for preventing any particles or dirt from lodging within the bellows 92.

In order to give an indication of the magnitude of the thermal expansion involved, it is noted that the inner shell 48 in the vessel 10 (FIG. 1) or 10A (FIG. 2) is usually made of stainless steel. As an example, this inner shell may have an axial (vertical) length of approximately twenty feet. The coefficient of thermal expansion is $0.961 \times 10^{-5}$ per degree F. for the stainless steel. The increase in temperature of the inner shell 48 is approximately 1,300° F.

$$\text{Linear Thermal Expansion of Inner Vessel 48} = \quad (3)$$
$$1{,}300° \text{ F.} \times 20 \text{ Ft.} \times 0.961 \times 10^{-5} = 0.250 \text{ Ft.}$$
$$= 3.00 \text{ Inches}$$

The outer bearing shell 30 is carbon steel having a coefficient of thermal expansion of $0.666 \times 10^{-5}$ per degree F. The increase in temperature of the outer bearing vessel is approximately 300° F.

$$\text{Linear Thermal Expansion of Outer Shell 30} = \quad (4)$$
$$300° \text{ F.} \times 20 \text{ Ft.} \times 0.666 \times 10^{-5} = 0.040 \text{ Ft.}$$
$$= 0.48 \text{ Inches}$$

The relative thermal expansion equals the difference between these two figures.

$$\text{Relative Thermal Expansion} = 3.00 - 0.48 = 2.52 \text{ Inches} \quad (5)$$

The vessel 10A includes three stations 11, 12 and 13 each containing a plurality of the centrifugal separator units 20. These units 20 in the respective stations may have different diameters as shown at the right in FIG. 2 at 20-1, 20-2 and 20-3, respectively. Alternatively, as shown dotted at the left, all of these units 20 in the respective stations may have the same diameter.

As explained in connection with the vessel 10, the particular "spouting velocities" within the various centrifugal separator units 20 or 20-1, 20-2 and 20-3 are arranged to provide the most efficient overall separation consistent with avoiding undue erosion. By virtue of the fact that the three particle-laden bleed gas streams, indicated by the arrows 71, 72 and 73, are maintained separate from each other in the vessel 10A, there is no possibility for separated larger particles from an earlier station to contaminate cleaned gas flow, indicated by the arrow 37, issuing from the separator units in a later station.

Another very effective progression in sizes for the I.D. of the outer tubes 16, and O.D. for the inner tubes 14 in the respective separator units 20-1, 20-2 and 20-3 in the respective stations is: twenty-seven inch I.D. by eighteen inch O.D.; eighteen inch I.D. by twelve inch O.D.; and six inch I.D. by four inch O.D. For example, there may be equal numbers of the large units 20-1 and intermediate units 20-2, and then the numbers of the small units 20-3 may be four times as many as the number of intermediate units 20-2. Then the flow velocity, such flow being indicated by the arrow 29, (FIG. 5) in the intermediate units 20-2 is approximately 2.25 times the flow velocity in the large units 20-1 while the average radius of the annular channel 18 is 0.67 times as large. Therefore, the relative centrifugal effect in the intermediate units 20-2 in the second station as compared with the large units 20-1 in the first station is:

$$\left.\begin{array}{c}\text{Relative Centrifugal Effect}\\ \text{of Station 2 to Station 1}\end{array}\right\} = \frac{(2.25)^2}{0.67} = 7.6 \quad (6)$$

The flow velocity in the small units 20-3 (which are four times as numerous as the intermediate units) is again 2.25 times the flow velocity in the intermediate units 20-2. Thus, the relative centrifugal effect in the third station is again 7.6 times greater than in the second station.

The critical flow nozzles 67, 68, 69 for the vessels 10 and 10A may comprise orifice plates or any other configuration of critical flow nozzle as may be desired for a particular installation. They are made of hard cast steel which is highly resistant to erosion.

Each of the mutually isolated bleed flows, indicated by the arrows 71, 72 and 73 is a very minor proportion of the total gas inflow, as signified by the arrow 25. For example, they may each comprise only a fraction of 1% of the total inflow. Thus, the sum total of the three bleed flows is approximately 1% of the total gas input.

It is believed that the many advantages of this multi-station downflow separation method and apparatus will now be apparent to those skilled in the art. It is also apparent that a number of variations and modifications may be made in the method and apparatus without departing from the scope and spirit of the present invention. Accordingly, the foregoing description is to be construed as illustrative only, rather than limiting. The invention is limited only by the following claims and all equivalents thereto.

I claim:

1. A method of separating particles from a particle-laden gas comprising the steps of:
   providing a plurality of axially-extending, separating stations in generally axial alignment at spaced-apart, successively lower elevations;
   in a first of said stations performing the steps of:
   (a) swirling the gas with a given centrifugal action, and immediately thereafter, (b) directing the gas downwardly through a first plurality of annular channels,
   then suddenly changing the direction of the gas and causing it to suddenly turn inwardly away from each of said channels, to cause particles of given sizes to be separated therefrom and left in said channels,
   causing the inwardly-turned gas to flow again in the same said generally axial direction, and obstructing flow of said inwardly-turned gas in the opposite axial direction, and downwardly away from said first station into an intermediate region,
   removing the separated particles together with a minor, bleed quantity of the gas from the bottom of the annular channels in said first station,
   flowing the gas downwardly from the intermediate region to a second of said stations, and in said second station performing the steps of:
   swirling the gas downwardly through a second plurality of annular channels under a more powerful centrifugal action than said given centrifugal action, and immediately thereafter directing the gas to, and conducting it in the same said generally axial direction through, a second plurality of annular channels,
   then suddenly changing the direction of the gas and causing it to suddenly turn inwardly away from said second plurality of annular channels, to cause particles smaller in size than said given sizes to be separated therefrom and left in said second plurality of channels,
   causing the gas which has been turned inwardly from said second plurality of channels to flow again in the same said generally axial direction, and obstructing flow thereof in the opposite axial direction, and downwardly away from said second station, and
   removing the smaller size particles together with a minor, bleed quantity of the gas from the bottom of the plurality of annular channels in said second station.

2. The method of separating particles from a particle-laden gas as claimed in claim 1, in which:
   said more powerful centrifugal action in said annular channels in said second station is generated by swirling the gas in said channels in said second station with smaller radii of curved flow than occurred in the annular channels in said first station.

3. The method of separating particles from a particle-laden gas as claimed in claim 1, in which:
   said more powerful centrifugal action in said annular channels in said second station is generated by swirling the gas through said annular channels in said second station at a greater velocity than that at which the gas is swirled through the annular channels in said first station.

4. The method of separating particles from a particle-laden gas as claimed in claim 1, in which:
   said more powerful centrifugal action in said annular channels in said second station is generated by swirling the gas in said annular channels in said second station at a higher velocity than that at which the gas is swirled through said annular channels in said first station, and also causing said gas in said annular channels of said second station to swirl with smaller radii of curved flow than occurred in said annular channels of said first station.

5. The method of separating particles from a particle-laden gas as claimed in claim 1, 2, 3 or 4, comprising the further steps of:
   providing a third separating station in generally axial alignment with said first and second stations, and at a lower elevation than said second separating station, causing the gas to flow downwardly away from said second station into a second intermediate region, from said second intermediate region flowing the gas downwardly in to said third station, and in said third station performing the steps of:

swirling the gas downwardly through a third plurality of annular channels under a greater centrifugal action than said more powerful centrifugal action, and immediately thereafter directing the gas to, and conducting it in the same said generally axial direction through, a third plurality of annular channels, then suddenly changing the direction of the gas and causing it to suddenly turn inwardly away from said third plurality of annular channels, to cause particles more minute than said given and smaller size particles to be separated therefrom and left in said third plurality of channels, causing the gas which has been turned inwardly from said third plurality of channels to flow again in the same said generally axial direction, and obstructing flow thereof in the opposite axial direction, and downwardly away from said third station, and removing the more minute particles together with a minor, bleed quantity of the gas from the bottom of the plurality of annular channels in said third station.

6. The method of separating particles from a particle-laden gas as claimed in claim 5, in which:

said greater centrifugal action in said annular channels in said third station is generated by swirling the gas through said channels of said third station with smaller radii of curved flow than occurred in the annular channels in said second station.

7. The method of separating particles from a particle-laden gas as claimed in claim 5, in which:

said greater centrifugal action in said annular channels in said third station is generated by swirling the gas through said annular channels of said third station at a greater velocity than that at which the gas is swirled through the annular channels in said second station.

8. The method of separating particles from a particle-laden gas as claimed in claim 5, in which:

said greater centrifugal action in said annular channels in said third station is generated by swirling the gas in said annular channels of said third station at a higher velocity than that at which the gas is swirled in said annular channels in said second station, and also causing said gas in said annular channels of said third station to swirl with smaller radii of curved flow than occurred in said annular channels of said second station.

9. An improved, downflow, centrifugal separator apparatus, for separating particulate matter from particle-laden gas having a given velocity and pressure, said apparatus having a plurality of elongate, vertically-disposed separator units, each of said units having a vertically-disposed tube which defines a channel within which to conduct particle-laden gas; first means within said tube for causing particle-laden gas admitted into said tube to be (a) centrifugally swirled, and (b) directed into said channel; an elongate, vertically-disposed vessel enclosing said separator units, said vessel having an inlet opening, substantially at an uppermost end thereof, and above said separator units, for admitting particle-laden gas into said separator units and into said tubes thereof, and said vessel having an outlet opening, substantially at a lowermost end thereof, and below said separator units, for discharging therethrough particle-removed gas from said units; said units further having means for removing separated particles, together with a minor percentage of gas, from said tubes; a first station, within said vessel, comprising a first plurality of said separator units mounted therewithin in parallel relationship; a second station, within said vessel, comprising a second plurality of separator units mounted therewithin in parallel relationship; said second station being spaced apart from said first station, axially of said vessel; and means intermediate said stations for conducting particle-separated gas from said first station to said second station; wherein the improvement is comprised by:

said separator units each having an additional tube positioned inside said vertically disposed tube so as to define an annular channel therebetween, and said first means comprises means for swirling gas with a given centrifugal action, and directing gas immediately thereafter into said annular channel to cause flow thereof in a generally axial direction; wherein said additional inner tube including slots therein for causing gas to turn inwardly, from said annular channel, into said tube;

said additional tube having a hosepiece positioned and arranged for causing gas turned into said tube from said channel to be redirected in said same generally axial direction, and (b) obstructing flow of such turned gas in the opposite axial direction; and said first means of said first station comprises means for swirling gas with a centrifugal action which is less than the centrifugal action with which said first means of said second station can swirl gas.

10. An improved, downflow, centrifugal separator apparatus, according to claim 9, in which:

said separator units in said second station have annular channels which are of smaller radius than the annular channels of the separator units in said first station for providing more powerful centrifugal action in the second station.

11. An improved, downflow, centrifugal separator apparatus, according to claim 9, in which:

the sum total of the cross-sectional areas of the annular channels of the separator units in the second station is less than the sum total of the cross-sectional areas of the annular channels of the separator units in the first station for causing greater flow velocity in the annular channels in the second station, and for providing more powerful centrifugal action in the second station.

12. An improved, downflow, centrifugal separator apparatus, according to claim 9, in which:

said separator units in said second station have annular channels which are of smaller radius than the annular channels of the separator units in said first station, and the sum total of the cross-sectional areas of the annular channels of the separator units in said second station is less than the sum total of the cross-sectional areas of the annular channels of the separator units in the first station for causing greater flow velocity in the smaller radius annular channels in the second station, and for providing more powerful centrifugal action in the second station.

13. An improved, downflow, centrifugal separator apparatus, according to claim 9, further including:
a third station, within said vessel, comprising a third plurality of separator units mounted therewithin in parallel relationship; said third station being in spaced-apart adjacency to said second station, axially of said vessel; and
means intermediate said second and third stations for conducting particle-separated gas from said second station to said third station; wherein
said first means of said second station further comprises means for swirling gas with a centrifugal action which is less than the centrifugal action with which said first means of said third station can swirl gas.

14. An improved, downflow, centrifugal separator apparatus, according to claim 13, in which:
said separator units in said third station have annular channels which are of smaller radius than the annular channels of the separator units in said second station for providing more powerful centrifugal action in the third station.

15. An improved, downflow, centrifugal separator apparatus, according to claim 13, in which:
the sum total of the cross-sectional areas of the annular channels of the separator units in the third station is less than said sum total of the cross-sectional areas of the annular channels of said separator units in the second station for providing more powerful centrifugal action in said third station.

16. An improved, downflow, centrifugal separator apparatus, according to claim 13, in which:
said separator units in said third station have annular channels which are of smaller radius than the annular channels of the separator units in said second station and the sum total of the cross-sectional areas of the annular channels in said third station is less than said sum total of the cross-sectional areas of the annular channels in said second station for causing greater flow velocity in the smaller radius channels of said third station.

17. A multi-station centrifugal separator apparatus, for separating particular matter from particle-laden gas, comprising:
an elongated, separator vessel having an inlet near one end thereof for flowing particle-laden gas into the vessel and having an outlet near the other end thereof for flowing particle-removed gas out of the vessel,
a plurality of stations in said vessel, each station containing a plurality of tubular centrifugal separator units,
a first of said stations being positioned in said vessel near the inlet,
a second of said stations being positioned in said vessel downstream from said first station,
a third of said stations being positioned in said vessel downstream from said second station,
said first station including first and second spaced-apart tube sheets,
said first tube sheet extending generally across the interior of the vessel for defining an inlet chamber located between said first tube sheet and said inlet,
said second tube sheet extending generally across the interior of said vessel spaced below said first tube sheet for defining a first particle discharge chamber located between said first and second tube sheets,
said second station including third and fourth tube sheets,
said third tube sheet extending generally across the interior of the vessel spaced below said second tube sheet for defining a first intermediate chamber located between said second and third sheets,
said fourth tube sheet extending generally across the interior of the vessel spaced below said third tube sheet for defining a second particle discharge chamber located between said third and fourth tube sheets,
said third station including fifth and sixth tube sheets,
said fifth tube sheet extending generally across the interior of the vessel spaced below said fourth tube sheet for defining a second intermediate chamber located between said fourth and fifth tube sheets,
said sixth tube sheet extending generally across the interior of the vessel spaced below said fifth tube sheet for defining a third particle discharge chamber located between said fifth and sixth tube sheets,
a plurality of first tubular centrifugal separator units all of a same predetermined size in said first station having open, tubular, first upper ends in communication with said inlet chamber, and extending up through and being secured to said first tube sheet and having open, tubular second lower ends in communication with said first intermediate chamber, and extending down through and being secured to said second tube sheet,
a second plurality of second tubular centrifugal separator units all of a same predetermined size in said second station having open, tubular, first upper ends in communication with said first intermediate chamber, and extending up through and being secured to said third tube sheet and having open, tubular, second lower ends in communication with said second intermediate chamber, and extending down through and being secured to said fourth tube sheet,
a third plurality of third tubular centrifugal separator units all of the same predetermined size in said third station having open, tubular, first upper ends in communication with said second intermediate chamber, and extending up through and being secured to said fifth tube sheet and having open, tubular, second lower ends in communication with said outlet, and extending down through and being secured to said sixth tube sheet,
said separator units each including an outer tube and each including an inner tube of smaller O.D. than the I.D. of the outer tube and positioned concentrically within said outer tube defining an annular channel extending downwardly between said inner and outer tubes, the lower end of said annular channel being closed, said inner tube having openings near the lower end of said annular channel, said openings defining a plurality of passageways from said annular channel into the interior of said inner tube, said inner tube being closed at the top and being open at the lower end thereof, which extends down below the closed lower end of said annular channel, said outer tubes of said first, second and third units extending up through said first, third and fifth tube sheets, respectively, and being secured thereto, and said inner tubes of said first, second and third units extending down through said second, fourth, and sixth tube sheets, respectively, and being secured thereto, the units in the first, second and third stations, respectively, having means of prescribed geometries for causing successively stronger centrifugal separating action in particulate-laden gas for separating successively smaller sizes of particles from such gas admitted into the vessel at a given velocity and pressure, and conducted through said vessel, said closed lower ends of said annular channels of said first, second and third units being in communication, respectively, with said first, second and third particle discharge chambers, for conducting separated particles together with a minor percentage of bleed gas from said annular channels into said respective particle discharge chambers, further including first, second and third conduits communicating with said first, second and third particle discharge chambers, respectively, and leading out of said vessel for conducting therefrom first, second and third streams of bleed gas and separated particles; wherein particle-laden gas admitted into said vessel is centrifuged in each of said first, second and third stations, successively smaller particles are removed from the gas in the first, second and third particle discharge chambers, respectively, and such gas is conducted, serially, from said inner tubes of said first station, through said first intermediate chamber, to said outer tubes of said second station, through said inner tubes of said second station, through said second intermediate chamber, to said outer tubes of said third station, and from said inner tubes of said third station to said vessel outlet.

18. Multi-station centrifugal separator apparatus as claimed in claim 17, in which:

said tubular centrifugal separator units in said second station have annular channels of smaller radius than the units in said first station for providing said stronger centrifugal separating action, and said tubular centrifugal separator units in said third station have annular channels of smaller radius than the units in said second station for providing still stronger centrifugal separating action.

19. Multi-station centrifugal separator apparatus as claimed in claim 17 or 18, in which:

said means of prescribed geometries comprises means for causing the velocity of gas flow through the annular channels of the tubular centrifugal separator units in the second station to be greater than in the first station, and the velocity of gas flow through the annular channels of the tubular centrifugal separator units in the third station to be greater than in the second station.

20. Multi-station centrifugal separator apparatus as claimed in claim 17 or 18, in which:

said vessel has an interior wall, and further including a support shell fixed within said separator vessel, said support shell being spaced inwardly from said vessel interior wall, said tube sheets are secured at their perimeters to said support shell, and said first, second and third conduits comprise means for accommodating thermal expansion of said support shell relative to the vessel.

21. Multi-station centrifugal separator apparatus as claimed in claim 20, in which:

said tube sheets are conical in configuration sloping downwardly and inwardly defining each of said first, second and third particle discharge chambers as conical in configuration with the low point being located at the center, and said first, second and third conduits are connected to the respective low points of said first, second and third particle discharge chambers with said first conduit extending down coaxial within said second conduit and said second conduit extending down coaxial within said third conduit.

22. Multi-station centrifugal separator apparatus as claimed in claim 20, in which:

said tube sheets are conical in configuration sloping downwardly and inwardly toward the center defining each of said first, second and third particle discharge chambers as conical in configuration with the low point at the center, and said lower ends of said annular channels of said first, second and third units communicate with the respective particle discharge chamber via orifices formed therein and aimed downwardly and inwardly toward the low point of the respective particle discharge chamber for jetting the bleed gas therefrom as downwardly and inwardly aimed jets for serving to aid gravitation in causing the separated particles to move downwardly and inwardly toward the low point of the respective particle discharge chamber.

* * * * *